United States Patent
Singer et al.

(10) Patent No.: US 9,344,720 B2
(45) Date of Patent: May 17, 2016

(54) ENTROPY CODING TECHNIQUES AND PROTOCOL TO SUPPORT PARALLEL PROCESSING WITH LOW LATENCY

(71) Applicant: Apple Inc., Cupertino, CA (US)

(72) Inventors: David W. Singer, San Francisco, CA (US); Alexandros Tourapis, Milpitas, CA (US); Athanasios Leontaris, Mountain View, CA (US); Xiaosong Zhou, Campbell, CA (US)

(73) Assignee: Apple Inc., Cupertino, CA (US)

( * ) Notice: Subject to any disclaimer, the term of this patent is extended or adjusted under 35 U.S.C. 154(b) by 644 days.

(21) Appl. No.: 13/715,088

(22) Filed: Dec. 14, 2012

(65) Prior Publication Data

US 2014/0044194 A1 Feb. 13, 2014

Related U.S. Application Data

(60) Provisional application No. 61/680,590, filed on Aug. 7, 2012.

(51) Int. Cl.
| | |
|---|---|
| H04N 11/04 | (2006.01) |
| H04N 19/13 | (2014.01) |
| H04N 19/70 | (2014.01) |
| H04N 19/117 | (2014.01) |
| H04N 19/174 | (2014.01) |
| H04N 19/436 | (2014.01) |

(52) U.S. Cl.
CPC ....... *H04N 19/00121* (2013.01); *H04N 19/117* (2014.11); *H04N 19/13* (2014.11); *H04N 19/174* (2014.11); *H04N 19/436* (2014.11); *H04N 19/70* (2014.11)

(58) Field of Classification Search
CPC .......... H04N 19/00121; H04N 19/117; H04N 19/13; H04N 19/174; H04N 19/436; H04N 19/70
USPC ...................................... 375/240.01
See application file for complete search history.

(56) References Cited

U.S. PATENT DOCUMENTS

| | | | |
|---|---|---|---|
| 5,057,917 A | * | 10/1991 | Shalkauser et al. ...... 375/240.12 |
| 5,122,875 A | | 6/1992 | Raychaudhuri et al. |
| 5,583,500 A | * | 12/1996 | Allen et al. ................... 341/107 |
| 5,717,394 A | * | 2/1998 | Schwartz et al. ............... 341/51 |

(Continued)

OTHER PUBLICATIONS

Bross et al., "High Efficiency Video Coding (HEVC) Text Specification Draft 7," Joint Collaborative Team on Video Coding (JCT-VC) of ITU-T SG16 WP3 and ISO/IEC JTC1/SC29/WG11, 9th Meeting: Geneva, CH, Apr. 27-May 7, 2012.

(Continued)

*Primary Examiner* — Shan Elahi
(74) *Attorney, Agent, or Firm* — Baker & Hostetler, LLP (57) ABSTRACT

In a communication system, parallel encoding and decoding of serially-coded data occurs in a manner that supports low latency communication. A plurality of data items may be coded as serially-coded data sequences and a transmission sequence may be built from them. An index table may be built having a plurality of entries representing respective start points of the serially-coded data sequences within the transmission sequence. The transmission sequence may be transmitted to a channel and, thereafter, the index table may be transmitted. Latencies otherwise involved in inserting an index table into the beginning of a transmission sequence may be avoided.

39 Claims, 8 Drawing Sheets

(56) References Cited

U.S. PATENT DOCUMENTS

| | | | |
|---|---|---|---|
| 6,028,961 A | 2/2000 | Shimomura | |
| 6,222,887 B1 * | 4/2001 | Nishikawa et al. | 375/240.26 |
| 6,493,385 B1 | 12/2002 | Sekiguchi et al. | |
| 6,496,591 B1 * | 12/2002 | Rhoads | 382/100 |
| 7,983,443 B2 * | 7/2011 | Rhoads | 382/100 |
| 8,098,740 B2 | 1/2012 | Suh et al. | |
| 8,098,741 B2 | 1/2012 | Suh et al. | |
| 8,102,921 B2 | 1/2012 | Suh et al. | |
| 8,520,958 B2 * | 8/2013 | Singh et al. | 382/234 |
| 2002/0061184 A1 * | 5/2002 | Miyamoto | 386/68 |
| 2002/0141499 A1 * | 10/2002 | Goertzen | 375/240.12 |
| 2006/0098734 A1 * | 5/2006 | Cho et al. | 375/240.03 |
| 2006/0147122 A1 * | 7/2006 | Srinidhi | 382/235 |
| 2006/0233239 A1 * | 10/2006 | Sethi et al. | 375/240.03 |
| 2006/0291570 A1 * | 12/2006 | Kitamura et al. | 375/240.28 |
| 2007/0071096 A1 * | 3/2007 | Chen et al. | 375/240.12 |
| 2008/0049844 A1 * | 2/2008 | Liu et al. | 375/240.27 |
| 2008/0069247 A1 * | 3/2008 | He | 375/240.29 |
| 2008/0120676 A1 * | 5/2008 | Morad et al. | 725/127 |
| 2008/0181300 A1 * | 7/2008 | Hosaka et al. | 375/240.03 |
| 2008/0285874 A1 * | 11/2008 | Fukuhara et al. | 382/248 |
| 2009/0028247 A1 * | 1/2009 | Suh et al. | 375/240.25 |
| 2009/0080788 A1 * | 3/2009 | Lynch et al. | 382/246 |
| 2009/0092326 A1 * | 4/2009 | Fukuhara et al. | 382/233 |
| 2009/0129481 A1 * | 5/2009 | MacInnis et al. | 375/240.25 |
| 2010/0191859 A1 * | 7/2010 | Raveendran | 709/231 |
| 2011/0125987 A1 * | 5/2011 | Plondke et al. | 712/208 |
| 2011/0150351 A1 * | 6/2011 | Singh et al. | 382/234 |
| 2011/0200104 A1 | 8/2011 | Korodi et al. | |
| 2011/0235699 A1 * | 9/2011 | Huang et al. | 375/240.02 |
| 2011/0243222 A1 * | 10/2011 | Choi et al. | 375/240.03 |
| 2011/0274180 A1 * | 11/2011 | Lee et al. | 375/240.25 |
| 2012/0007992 A1 | 1/2012 | Zhou | |
| 2012/0033742 A1 * | 2/2012 | Wei et al. | 375/240.25 |
| 2013/0022111 A1 * | 1/2013 | Chen et al. | 375/240.12 |
| 2014/0092987 A1 * | 4/2014 | Singer et al. | 375/240.25 |

OTHER PUBLICATIONS

Bross et al., "High Efficiency Video Coding (HEVC) Text Specification Draft 8," Joint Collaborative Team on Video Coding (JCT-VC) of ITU-T SG16 WP3 and ISO/IEC JTC1/SC29/WG11, 10th Meeting: Stockholm, SE, Jul. 11-20, 2012.

Singer et al., "Specific Uses of the Slice Extension," Joint Collaborative Team on Video Coding of ITU-T SG 16 WP 3 and ISO/IEC JTC1/SC29/WG11, 11th Meeting, Shanghai, China, Oct. 2012.

Singer et al., "The General Structure and Syntax of the Slice Extension," Joint Collaborative Team on Video Coding of ITU-T SG 16 WP 3 and ISO/IEC JTC1/SC29/WG11, 11th Meeting, Shanghai, China, Oct. 2012.

Clare et al., "Wavefront Parallel Processing for HEVC Encoding and Decoding," Joint Collaborative Team on Video Coding of ITU-T SG 16 WP3 and ISO/IEC JTC1/SC29/WG11, 6th Meeting, Torino, IT, Jul. 14-22, 2011.

Henry et al., "Wavefront Parallel Processing," Joint Collaborative Team on Video Coding of ITU-T SG 16 WP3 and ISO/IEC JTC1/SC29/WG11, 5th Meeting, Geneva, CH, Mar. 16-23, 2011.

Bross et al., "High Efficiency Video Coding (HEVC) Text Specification Draft 10 (for FDIS & Consent)," Joint Collaborative Team on Video Coding (JCT-VC) of ITU-T SG16 WP3 and ISO/IEC JTC1/SC29/WG11, 12th Meeting: Geneva, CH, Jan. 14-23, 2013.

* cited by examiner

ENTROPY CODING TECHNIQUES AND PROTOCOL TO SUPPORT PARALLEL PROCESSING WITH LOW LATENCY

CROSS-REFERENCE TO RELATED APPLICATIONS

The present invention benefits from priority of U.S. Provisional Application Ser. No. 61/680,590, filed Aug. 7, 2012 and entitled "Entropy Coding Techniques and Protocol to Support Parallel Processing with Low Latency," the disclosure of which is incorporated herein in its entirety.

BACKGROUND

Various video coding systems can be designed to support parallel entropy coding and entropy decoding processes for different segments of video, for example, slices, tiles or blocks. As one of the final stages of video coding, coded data from different spatial areas of a frame is formed into data sequences and entropy-coded as a string of bits. Early entropy coding techniques had been serial. A coding context carried from bit to bit, down each sequence, and then to the beginning of a next sequence. Until the entropy coding was undone serially, a decoder could not perform any parallel processing of constructs within the entropy-coded sequence.

Wavefront Parallel Processing ("WPP") introduced the idea of selecting some or all of the sequences to get their entropy context from an initial portion of a previous sequence rather than from an end portion of the previous sequence. By developing the context of a given sequence from the start of the preceding sequence, parallel entropy decoding of the second sequence could be performed once decoding of the first sequence developed a decoding context for the second sequence. Thus, WPP supports parallel processing of the sequences to some degree.

The WPP technique, however, has certain consequences. Parallel decoding of sequences cannot be performed until sequence start points have been identified and an appropriate context has been developed for each sequence. Because the context of a current sequence is developed by entropy decoding a relevant portion of a previously-coded sequence, the WPP introduces dependencies among the sequences. Moreover, because the entropy-coded data is a serially coded bitstream, positions of the various sequences must be identified by an index field table that specifies start points of the sequences.

In the current design of the forthcoming HEVC coding standard, it has been proposed to provide an index in front of the entropy-coded data that identifies the bit-positions of these start points. This causes significant delay, however, because an encoder must buffer all coded video data to be represented by the table, build the table and add it to a coded bitstream as a position that precedes the coded data itself. Essentially, an encoder may start transmitting coded video data of a segment to which the table applies only after the segment is coded in its entirety.

The inventors perceive a need in the art for an entropy coding protocol that supports parallel-processing and yet avoids the latencies associated with prior solutions.

DETAILED DESCRIPTION

Embodiments of the present invention provide techniques to support parallel encoding and decoding of serially-coded data in a manner that supports low latency communication. The techniques involve coding a plurality of data items as serially-coded data sequences and building a transmission sequence from them. An index table may be built having a plurality of entries representing respective start points of the serially-coded data sequences within the transmission sequence. The transmission sequence may be transmitted to a channel and, thereafter, the index table may be transmitted. Thus, latencies involved in inserting an index table into the beginning of the transmission sequence may be avoided.

The following discussion presents the embodiments of the present invention in the context of a video coding system but the principles of the present invention are not so limited. The present invention may find application in a variety of coding environments, such as audio coding systems, encryption systems and the like, where entropy coding of strings may provide benefits.

Figure 1:
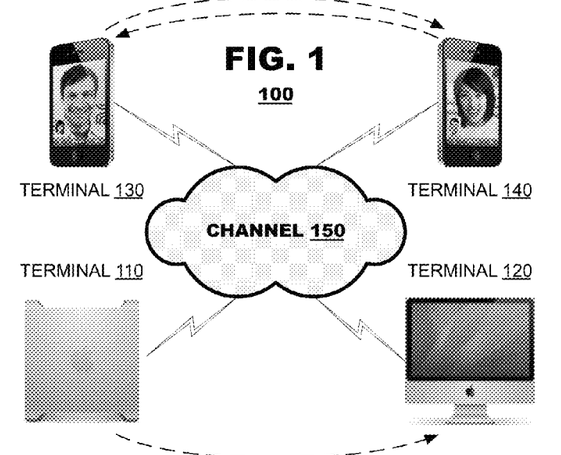
FIG. 1 illustrates a system suitable for use with embodiments of the present invention.

FIG. 1 illustrates a system 100 suitable for use with embodiments of the present invention. The system 100 may include at least two terminals 110-120 interconnected via a channel 150. For unidirectional transmission of data, a first terminal 110 may code video data at a local location for transmission to the other terminal 120 via the channel 150. The second terminal 120 may receive the coded video data of the other terminal from the channel 150, decode the coded data and display the recovered video data. Unidirectional data transmission is common in media streaming applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the channel 150. Each terminal 130, 140 also may receive the coded video data transmitted by the other terminal, may decode the coded data and may display the recovered video data at a local display device.

In FIG. 1, the terminals 110-140 are illustrated as servers, personal computers and smart phones but the principles of the present invention are not so limited. Embodiments of the present invention find application with laptop computers, tablet computers, media players and/or dedicated video conferencing equipment. The channel 150 represents any number of networks that convey coded video data among the terminals 110-140, including for example wireline and/or wireless communication networks. A communication network may exchange data in circuit-switched and/or packet-switched channels. Representative networks include telecommunications networks, local area networks, wide area networks and/or the Internet. In another embodiment, the channel 150 may be provided as a storage device, for example, an electrical, optical or magnetic storage device. For the purposes of the present discussion, the architecture and topology of the channel 150 is immaterial to the operation of the present invention unless explained hereinbelow.

Figure 2:
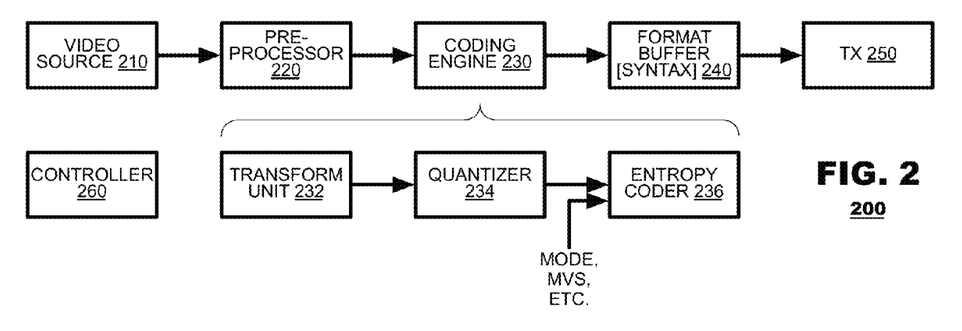
FIG. 2 is a simplified block diagram of a video coding system according to an embodiment of the present invention.

FIG. 2 is a simplified block diagram of a video coding system 200 according to an embodiment of the present invention. The coding system 200 may include a video source 210, a pre-processor 220, a coding engine 230, a format buffer 240, a transmitter 250 and a controller 260. The video source 210 may supply source video data to the rest of the system 200. Common video sources 210 include cameras that capture video data representing local image data and storage units that store video data generated by some other system (not shown). Typically, the video data is organized into frames of image content.

The pre-processor 220 may perform various analytical and signal conditioning operations on video data. For example, the pre-processor 220 also may apply various filtering operations to the frame data to improve efficiency of coding operations applied by a video coder 230. The pre-processor 220 also may perform analytical operations on the source video data to derive statistics of the video, which may be provided to the controller 260 to otherwise manage operations of the video coding system 200.

The coding engine 230 may perform coding operations on the video sequence to reduce the sequence's bit rate. The coding engine 230 may parse each frame into sub-units, such as slices and coding units ("CUs"), and may code the sub-units according to motion compensated predictive coding techniques that exploit spatial and/or temporal redundancies therein. For purposes of the present discussion, it is sufficient to note that, as part of its operation, the coding engine may include a CU-based coder that includes a transform unit 232, a quantizer 234 and an entropy coder 236. The coding engine 230 may select and apply a coding mode to the CU. Thereafter, pixels of the CUs (which may be expressed as pixel residuals, depending on the selected coding mode) may be subject to a transform, for example a discrete cosine transform or a wavelet transform. Transform coefficients obtained from the transform unit 232 may be quantized by a quantization parameter (Qp) in the quantizer 234. The coding mode and the quantized coefficients may be entropy coded by the entropy coder 236.

Figure 3:
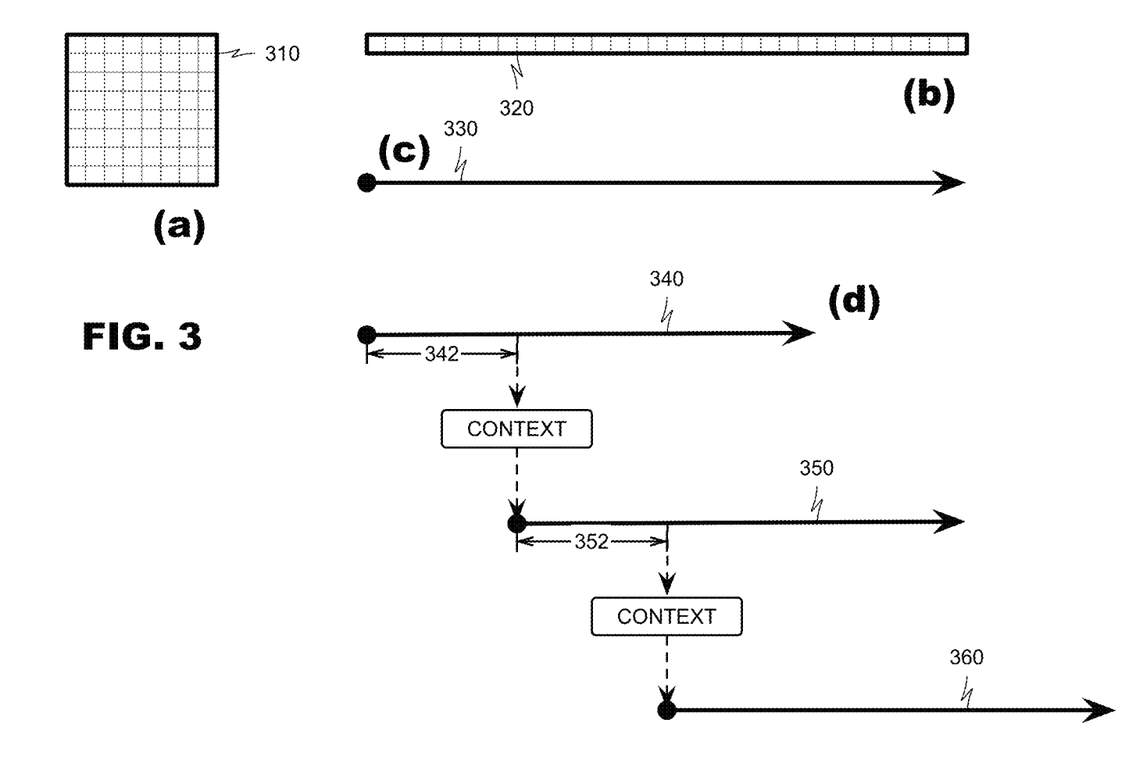
FIG. 3 schematically illustrates an exemplary entropy coding process.

FIG. 3 schematically illustrates an exemplary entropy coding process. FIG. 3(a) illustrates a matrix 310 of quantized coefficients that may be output from a quantizer 234 (FIG. 2). Entropy coding typically involves arranging the matrix 310 into a serial string 320 of coefficients (FIG. 3(b)) and coding the serial string 320 according to an entropy coding technique such as Context-Adaptive Binary Arithmetic Coding (CABAC), Huffman coding, arithmetic coding, Elias gamma coding, Fibonacci coding, Golomb coding and Golomb-Rice coding. FIG. 3(c) is a graphical representation of an entropy-coded string 330 of data.

In an embodiment, shown in FIG. 3(d), where a context adaptive entropy coding technique is used, entropy coding of a first string 340 may develop a coding context for another string 350 that follows it. Further, entropy coding of the second string 350 may develop a coding context for a third string 360 that follows the second string 350. Thus, the coding techniques applied by the entropy coder 236 define prediction dependencies among the strings 340-360. The coding context of a given string (say, 360) may be developed from a portion 352 of the preceding string 350 and therefore, it is not necessary to code the preceding string 350 in its entirety before beginning coding of the subsequent string 360.

In another embodiment, strings may be entropy coded independently of each other, by using, for example, entropy slices or tile representations. This can further streamline the decoding process by eliminating the entropy decoding dependencies between strings. In such an embodiment, the coding context of each string may reset to a predetermined state at the onset of each string and, therefore, threads need not pass coding contexts among one another.

Returning to FIG. 2, coded data may be output from the block coder 230 to a format buffer 240. The format buffer 240 may store the output data from the coding engine 230 and build a datastream therefrom that adheres to a syntax of a coding protocol that governs communication among the terminals 110-140 (FIG. 1). For example, the format buffer 240 may build a CU datastream that includes syntactic elements that satisfies the protocol's requirements for CUs. The format buffer 240 may build a slice data stream from corresponding CU datastreams that satisfies the protocols requirements for slices. The format buffer 240 further may pack slice transmission data into other artifacts required by the protocol, for example, Network Adaptation Layer units (NAL units). The format buffer 240 also may accept data from other sources, such as audio coders and metadata sources (not shown). The format buffer 240 may output a serial datastream representing the system's output to a transmitter 250, which may format the datastream for transmission to the channel and output the transmission data from the coding system 200.

During operation, the coding system 200 may accept the input video sequence as a stream of video data, which may be coded and output from the system 200 on a running basis. Thus, at a time when the video source 210 provides a new frame to the system 200 for coding, the format buffer 240 and transmitter 250 may be outputting coded video data of earlier-received frames. Indeed, the format buffer 240 may output coded video data of early portions of a slice from a given frame while the coding engine 230 is generating coded video data later portions of the same slice. To provide high throughput, operations of the components illustrated in FIG. 2 may be distributed across parallel processing systems (not shown), subject to dependencies of the coding operations (for example, the entropy coding processes described above in FIG. 3(d)).

Figure 4:
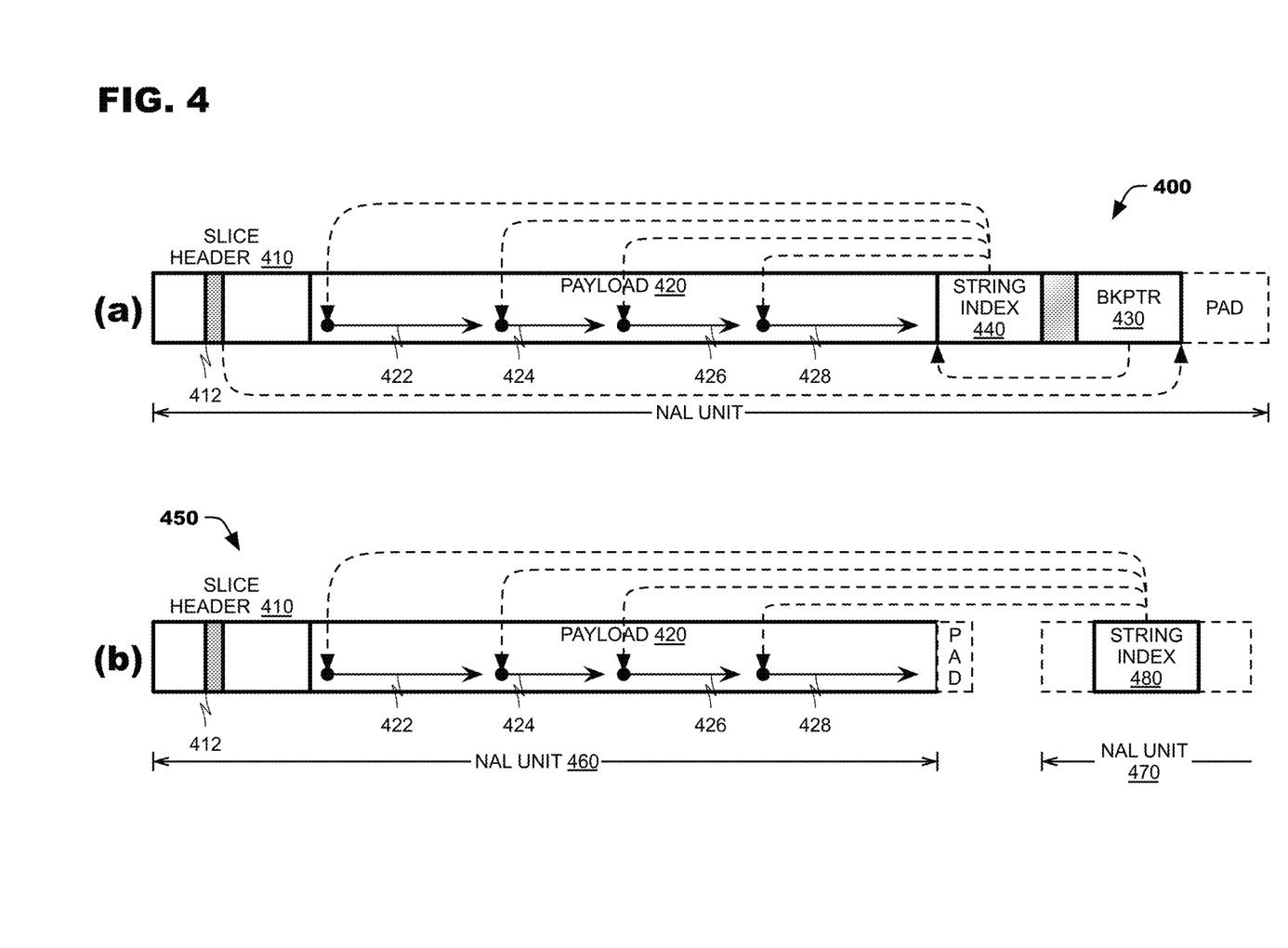
FIG. 4 illustrates syntax of a slice according to an embodiment of the present invention.

FIG. 4 schematically illustrates syntax of slices 400, 450 according to various embodiments of the present invention. In a first embodiment, shown in FIG. 4(a), a slice 400 may include a slice header 410, a slice payload 420, a backpointer 430 and a string index 440. The slice header 410 may include a data pattern indicating the onset of the slice 400, which may include metadata (not shown) defining coding parameters that have been applied to the slice. In an embodiment, the slice header 410 may include a flag 412 to indicate whether the slice 400 includes a backpointer 430 or not. The payload 420 may include coded video data of the slice, including one or more entropy-coded strings 472-478. The backpointer 430 may be provided at the end of the slice 400 and may identify a location of a string index 440 within the slice. The string index 440 may indicate locations of the strings 472-478 within the slice payload 420. In the embodiment illustrated in FIG. 4(a), the slice 400 may be provided in a common NAL unit.

As indicated, the slice header 410 may include a data pattern that indicates the start of a slice within the serial data stream and a flag 412 that indicates whether the slice 400 includes a backpointer 430. In an embodiment, the slice header 410 may include fields to provide the index table within the slice header 410 itself (not shown). Thus, embodiments of the present invention permit an encoder to place signaling for the index table 440 either at the beginning of a slice 400 within the slice header 410 or at the end of a slice whose location is identified by the backpointer 420 based on local coding decisions made by the encoder.

FIG. 4(b) schematically illustrates a syntax that may be used in accordance with another embodiment of the present invention. In the embodiment of FIG. 4(b), a slice 450 may be provided in a NAL unit 460 that is different from a NAL unit 470 in which the string index table 480 is provided. The slice may include a slice header 410 and payload 420 as in the FIG. 4(a) embodiment. The slice header 410 may include a flag 412 to indicate whether an index table 480 is used and the payload 420 may include entropy-coded strings 422-428. The index table 480 may include entries to indicate start points of the strings 422-428 within the slice 450.

As indicated, the embodiment of FIG. 4(b) may provide the string index table 480 in a NAL unit 470 that is separate from the NAL unit 460 in which the slice 450 is provided. A back pointer need not be used in the embodiment of FIG. 4(b). In this embodiment, the location of the index table may be provided expressly or impliedly within metadata of the second NAL unit 470 or it may be provided as a field within the slice header 410. In another embodiment, the string index table 480 may be provided within a supplemental enhancement information ("SEI") message within the coded bit stream. To maximize performance, often it will be most convenient to provide the string index table 480 in a NAL unit 470 that immediately follows the NAL unit 460 to which the table 480 refers.

The following tables illustrate a syntax of a slice in an embodiment consistent with FIG. 4(a). Table 1 illustrates a syntax of a slice 400 according to this embodiment.

TABLE 1

| slice_layer_rbsp( ) { | Descriptor |
|---|---|
| slice_header( ) | |
| slice_data( ) | |
| slice_extension( ) | |
| rbsp_slice_trailing_bits( ) | |
| } | | where slice_header( ) represents content of the slice header 410, slice_data( ) represents content of the slice payload 420, slice_extension( ) represents content of the index table 440 and the back pointer 430. The field rbsp_slice_trailing_bits( ) may represent a process for forming the transmission bitstream.

Table 2 illustrates an exemplary syntax that may be used within a slice header 410 according to these embodiments:

TABLE 2

| slice_header( ) { | Descriptor |
|---|---|
| ... | |
| if( tiles_or_entropy_coding_sync_idc = = 1 \|\| | |
|     tiles_or_entropy_coding_sync_idc = = 2 ) { | |
|     num_entry_point_offsets | ue(v) |
|     if( num_entry_point_offsets > 0 ) { | |
|         offset_len_minus1 | ue(v) |

TABLE 2-continued

| slice_header( ) { | Descriptor |
|---|---|
|         for( i = 0; i < num_entry_point_offsets; i++ ) | |
|             entry_point_offset[ i ] | u(v) |
|     } | |
| } | |

In the foregoing, the field num_entry_point_offsets may represent a number of strings included within the payload field 420 and, by consequence, the number of entries within the table. In this embodiment, the num_entry_point_offsets field may double as a flag 412 to identify the presence of a back pointer 430. A value of zero may indicate there are no table entries within the slice header 410 and may indicate impliedly that the slice 400 includes a back pointer 430. A non-zero value may identify a number of entries provided within the slice header. The entry_point_offset[i] fields may represent respective locations within the payload field 420 of the start points of the strings 472-478. For i>0, the field entry_point_offset[i] may be calculated as entry_point_offset[i]=entry_point_offset[i−1]+entry_point_offset_delta[i], where the entry_point_offset_delta[i] field represents a change in length among coded successively-coded strings.

As indicated, the backpointer 430 may include data that identifies the location of an index table 440. The backpointer 430 may include one or more variable length codes. As a series of variable length code, data of the backpointer 430 may be provided in reverse order within the slice 400. That is, backpointer data may start with the last bit position of the slice and propagate from the last bit position forward toward the slice header 410.

Table 3 illustrates an exemplary syntax that may be used for slice extension data according to these embodiments:

TABLE 3

| slice_extension( ) { | Descriptor |
|---|---|
|   encoded_length = 0; | |
|   while (slice_data_remaining( ) > | |
|       ue_length_of( encoded_length)) { | |
|     slice_extension_tag | ue(v) |
|     slice_extension_length | ue(v) |
|     encoded_length += slice_extension_length + | |
|         ue_length_of( slice_extension_tag ) + | |
|         ue_length_of( slice_extension_length ); | |
|     slice_extension_data | u(v) |
|   } | |
|   extension_back_pointer | rev-ue(v) |
| } | |

In this example, the slice_extension_data field occupies slice_extension_length bits and has a structure indicated by the slice_extension_tag value. The value of extension_back_pointer is equal to encoded_length, and, as indicated, may be in the bitstream with the bits in reverse order. The function ue_length_of(x) returns the number of bits needed to encode the value x as a ue(v). The slice_extension_tag of the entry_point array may be defined to be 0 (which compactly codes as the bit '1') and all other values may be reserved.

Table 4 illustrates a embodiment for slice_extension_data when slice_extension_tag==0:

TABLE 4

| slice_extension_data( ) { | Descriptor |
|---|---|
|   switch (slice_extension_tag) { | |
|   case 0: /* entry points */ | |
|     offset_len_minus1 | ue(v) |

TABLE 4-continued

```
slice_extension_data( ) {                                    Descriptor
            num_entry_point_offsets = 0;
            while (extension_data_remaining( )) {
                entry_point_offset[ i ]                      u(v)
                num_entry_point_offsets++;
            }
        break;
      }
}
```

This structure resembles the table structure in the slice header above (Table 2).

The foregoing discussion has presented the backpointer 430 and string index table 440 as the only metadata that is provided at the end of the slice 400. The principles of the present invention do not foreclose use of metadata 460 provided by other sources (not shown). In embodiments where no other data is permitted in the end-of-slice structures, a backpointer 430 need not include an express pointer to the index table 440.

String start points (shown as entry_point_offsets in Table 2 and Table 4) may be coded in a variety of ways. In a first embodiment, each string start point may be expressed as an offset from the end of the slice header. In a second embodiment, each string start point may be expressed as an offset from a start point of a preceding string (essentially, corresponding to prior string's length). In this embodiment, the start point of the first string may be taken to begin immediately following the end of the slice header.

In another embodiment, each string start point may be expressed as a difference in offsets between the current string's start point and the preceding string's start point (corresponding to a difference in lengths between the prior two strings). This is shown below in Table 5.

TABLE 5

```
i = 0;
    while (extension_data_remaining( )) {
        if (i == 0) entry_point_offset[0]                    ue(v)
            else { entry_point_offset_delta[ i ]             se(v)
        entry_point_offset[i] =
            entry_point_offset[ i − 1 ] +
                entry_point_offset_delta[ i ];
            i++;
    }
num_entry_point_offsets = i
```

Figure 5:
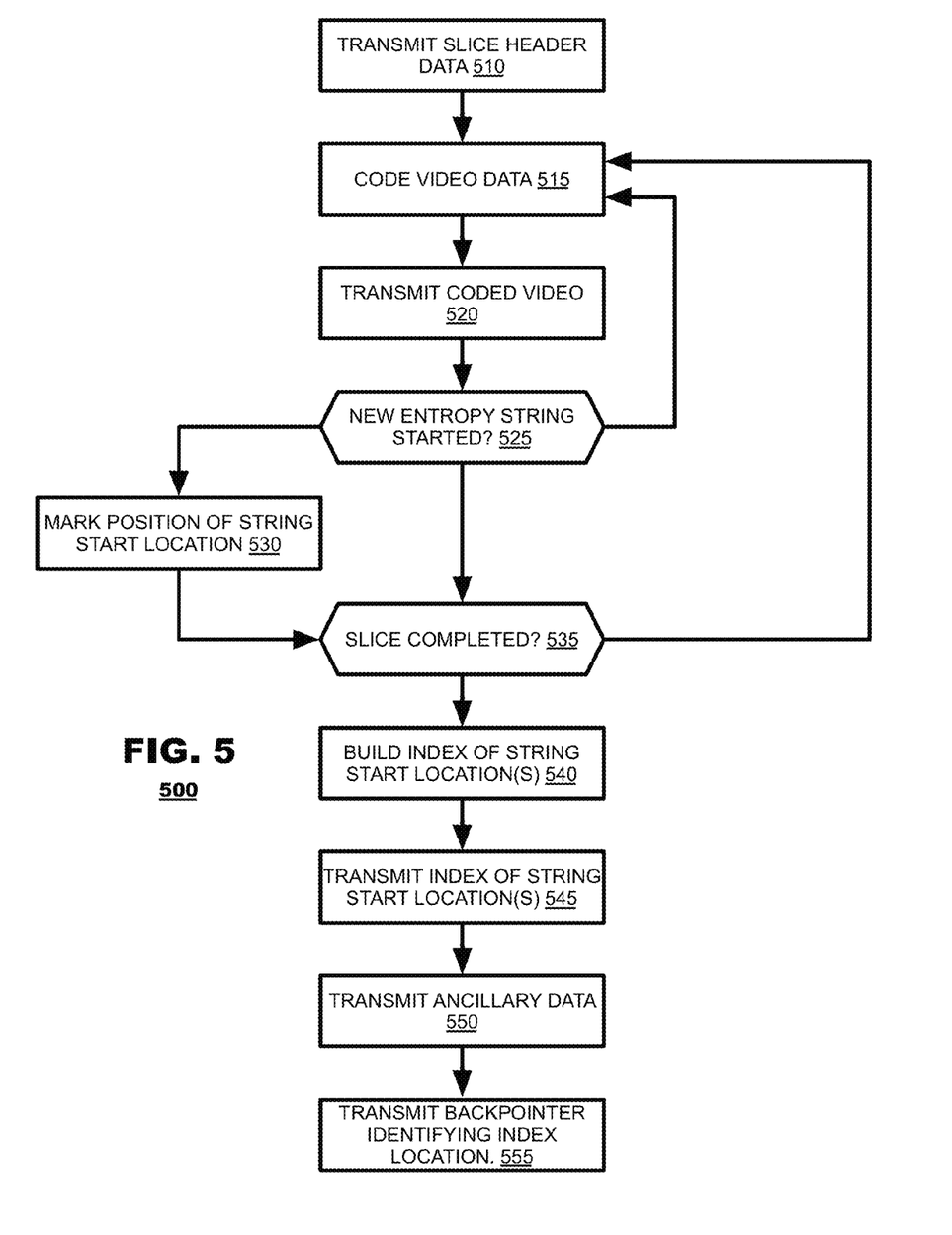
FIG. 5 illustrates a coding method according to an embodiment of the present invention.

FIG. 5 illustrates a coding method 500 according to an embodiment of the present invention. The method 500 may be applied when coding video data in slices. The method 500 may begin by transmitting a slice header 510. Thereafter, the method 500 may cause video data to be coded (box 515) and transmitted (box 520) on a running basis. As it codes the video data, the method 500 may determine when new entropy-coded strings are started (box 520) and, when they do, may record the position of those strings (box 530). Operations of boxes 515-530 may repeat during coding of the slice.

At some point, the method 500 will reach the end of a slice. The method 500 may determine when coding has reached the end of the slice (box 535) and, when it does, may build an index table representing string start locations within the slice (box 540). The method 500 may transmit the index table (box 545) and any other metadata that may be required to serve other decoding needs associated with the slice (box 550). As a final transmission associated with the slice, the method 500 may transmit data of the backpointer, which identifies the location of the index table and is transmitted in reverse bit order (box 555).

As indicated, operation of the method 500 advantageously allows coded data to be transmitted as it is generated, without having to build the index table first. The method 500 may mark location(s) of the entropy-coded strings as the video data is generated and transmitted. The method 500 may transmit the index table (box 545) and, finally, the backpointer (box 555) without incurring delays that would be associated with transmitting the index table as part of the slice header. In this manner, the method 500 contributes to reduced latency of transmission.

Figure 6:
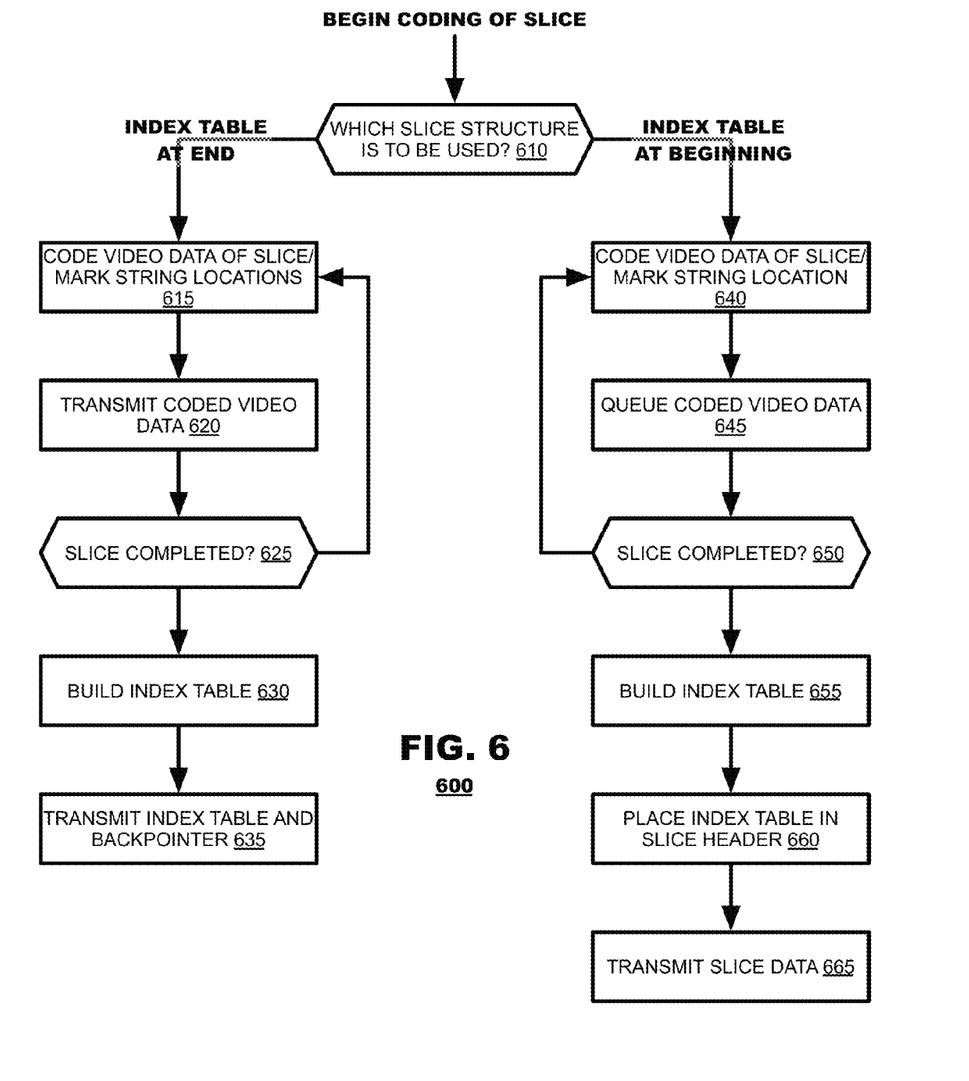
FIG. 6 illustrates a method according to another embodiment of the present invention.

FIG. 6 illustrates a method 600 according to another embodiment of the present invention. The FIG. 6 embodiment illustrates a method 600 that may accommodate dynamic selection of slice structure, whether to provide an index table at the end of a slice or the beginning of a slice. The method 600 may begin when coding of a new slice is to begin. At the outset, the method 600 may determine which slice structure is to be used (box 610). If the method 600 determines that the index table is to be provided at the end of the slice, the method 600 may invoke operations as described in FIG. 5. Specifically, the method 600 may cause video data to be coded and entropy-string locations to be recorded (box 615) and may cause the coded video data to be transmitted to decoder (not shown) as the coded video data is prepared (box 620). The method may repeat operations of boxes 615-620 until all video data associated with the slice has been coded (box 630).

When the method 600 determines that the slice has been completed (box 630), the method 600 may build the index table representing start positions of the strings (box 630). The method 600 may transmit the index table and, finally, the backpointer to the decoder (box 635).

If at box 610 the method 600 determines that the slice will have the index table at the beginning of the slice, operation may advance to box 640. The method 600 may code video data of the slice and mark string locations within the slice (box 640). The method 600 may store the coded video data in a buffer for later transmission (box 645). The method 600 may repeat operations of boxes 640-645 until all video data associated with the slice has been coded (box 650).

When the method 600 determines that the slice has been completed (box 650), the method 600 may build the index table representing start positions of the strings (box 655). The method 600 may place the index table in the slice header (box 660) and, finally, transmit the entirety of the slice to a decoder (box 665).

The method of 600 finds application with a multi-modal coding system that supports use of index tables both at the beginning and at the end of slices. As indicated, transmitting an index table at the end of the slice can reduce latency because coded video data may be transmitted as it is created (boxes 615-620). The method 600 may prove to be a natural extension of some coders that already support coding protocols that provide index tables at the beginning of slices. Thus, although the operations of boxes 640-665 involve greater transmission latency than the operations of boxes 615-635 (because transmission does not occur until box 665, when the entire slice has been coded), the embodiment of FIG. 6 may prove to be a useful extension of those coders.

Figure 7:
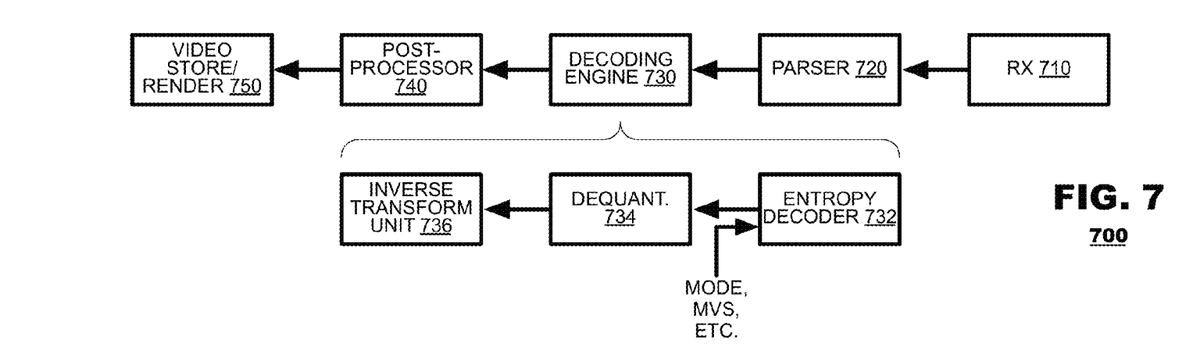
FIG. 7 is a simplified block diagram of a decoder according to an embodiment of the present invention.

FIG. 7 is a simplified block diagram of a decoder 700 according to an embodiment of the present invention. The decoder 700 may include a receiver 710, a datastream parser 720, a decoding engine 730, a post-processor 740 and a video renderer 750. The decoder 700 may invert coding operations applied by a video coder (FIG. 2). The receiver 710 may receive data from a channel and recover a serial datastream therefrom. The parser 720 may identify coding artifacts within the datastream and route such artifacts to appropriate decoding systems. For example, coded slice data may be output to the decoding engine 730 for processing. As part of this operation, the parser 720 may interpret slice headers or backpointers (as the case may be) to recover an index table and identify start points of entropy-coded strings within a received slice. The decoding engine 730 may invert coding operations performed by the coding engine of the video coder (FIG. 2) and, therefore, may perform motion compensated predictive decoding. The post-processor 740 may perform filtering or other operations upon recovered data. Recovered video data obtained therefrom may be output to the video renderer 710 for display or storage.

As illustrated in FIG. 7, the decoding engine 730 may include an entropy decoder 732, a dequantizer 734 and an inverse transform unit 732 that invert coding operations performed by their counterparts in the video coder (FIG. 2). The entropy decoder 732 may recover quantized coefficient data from entropy-coded strings provided in the slices (FIG. 4). The dequantizer 734 may scale dequantized coefficient data according to the quantization parameters used at the video coder. The inverse transform unit may perform an inverse transform on scaled coefficients output from the dequantizer 734 to generate pixel data therefrom. Thereafter, the recovered pixel data may be output to other stages (not shown) such as prediction units to generate final recovered pixel data.

Figure 8:
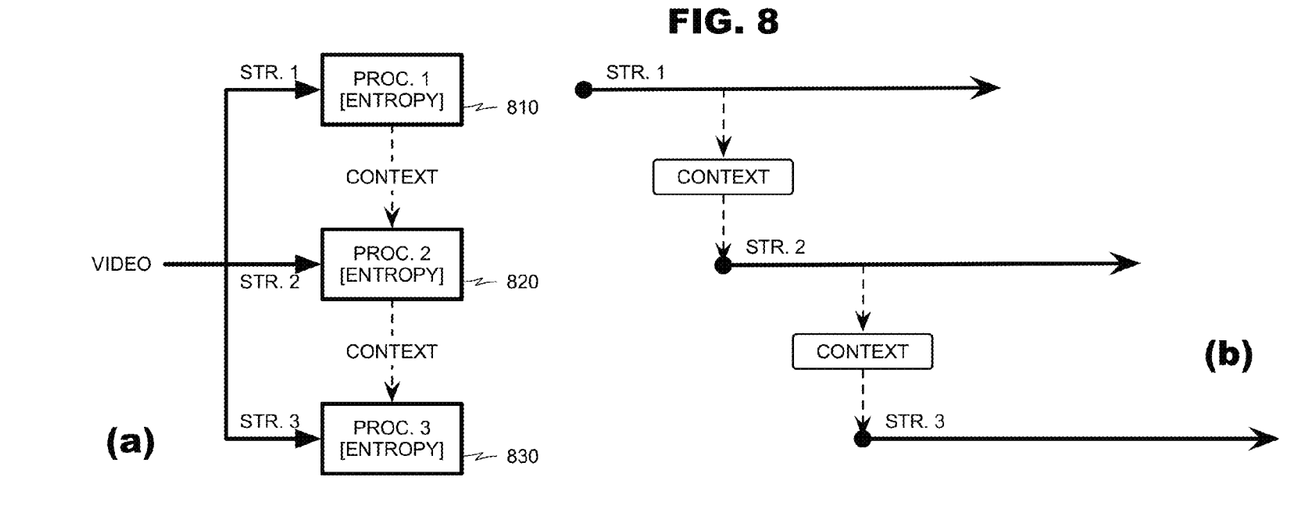
FIG. 8 illustrates an example of a multi-thread processing system suitable for use with entropy decoding according to an embodiment of the present invention.

FIG. 8 illustrates an example of a multi-thread processing system 800 suitable for use with entropy decoding according to an embodiment of the present invention. In an embodiment, a video decoder may employ parallel processing systems (herein, "threads") to perform entropy decoding. In this example, the multi-thread system 800 may include three processors 810-830, each to decode entropy-coded strings that may be found in a received slice (FIG. 4). Once string start points are identified, a first string may be provided to a first processor 810 to begin entropy decoding. Once the first string has been decoded sufficiently to develop a context for decoding the second string, the second string and context data may be provided to a second processor 820. The second processor 820 may decode the second string to generate context data in addition to the decoded data of the second string. Thereafter, data of a third string may be provided to a third processor 830 along with the context data provided by the second processor 820 and entropy-decoding of the third string may commence. Although in theory parallel decoding may be extended to additional threads indefinitely, in practice, the number of parallel threads likely will be limited to a finite number by system designers as tradeoff between the performance improvements to be obtained and the costs of additional resources that are required to provide such threads.

The principles of the present invention also find application with strings that are coded independently of each other. In such an embodiment, the coding context of each string may reset to a predetermined state at the onset of each string and, therefore, threads need not pass coding contexts among one another. Thus, the present invention may apply to entropy slices and tiles.

Figure 9:
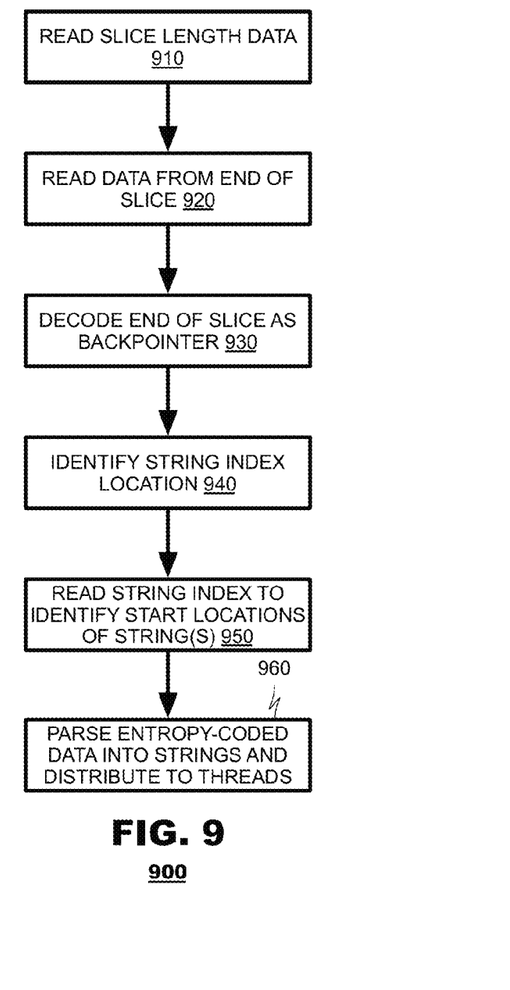
FIG. 9 illustrates an entropy decoding method according to an embodiment of the present invention.

FIG. 9 illustrates an entropy decoding method 900 according to an embodiment of the present invention. The method 900 may begin when a new coded slice is available for decoding. According to the method 900, slice length data may be received (box 910) to determine the length of a backpointer provided at the end of the slice. The slice length data may be derived from transmission data recovered by recovery processes within a receiver. In one embodiment, the length of a slice may be determined from the length of a NAL unit that contained the slice, less any padding bits that are indicated as provided within the NAL unit. In another embodiment, a boundary between slices may be determined from NAL unit start codes that indicate the beginning and ends of NAL units; the end of a slice within a current NAL unit may be taken as the bit that precedes a start code of a next-received NAL unit. Having identified the end of the slice, the method 900 may read data from the end of the slice in reverse bits order (box 920). The method 900 may decode the end-of-slice data as a backpointer (box 930) and identify the location of a string index therefrom (box 940). The back pointer may point to the index table directly or, alternatively, may point to a slice extension that includes data (such as a slice extension tag) that identifies the index table. The method 900 may read string index data to identify start locations of strings within the slice (box 950). Using the string start locations, the method 900 may parse payload data of the slice into the strings and may distribute the strings to parallel threads as shown in connection with FIG. 8.

Operation of the method 900 of FIG. 9 and the end-of-slice structures illustrated in FIG. 4 are believed to reduce decoder latency in many use cases. The performance consequences, however, may vary depending on data rates of the channel (FIG. 1) and resources available at the decoder (FIG. 7). Some use cases are informative:

For receivers that load from disk (e.g., the channel is a storage device) or otherwise get the whole NAL unit in an atomic unit, a decoder will have instant access to the entirety of a slice upon receipt. The decoder may estimate the position of the back-pointer immediately, retrieve the index table and parse the slice payload to begin parallel threads as illustrated in FIG. 8.

For receivers that receive coded slices incrementally, a decoder can perform single-threaded entropy decoding immediately upon reception. The decoder cannot perform parallel processing for entropy decoding, however, until the backpointer is received. Thus, if the decoder can perform single-thread entropy decoding at a rate faster than the data arrival rate, the decoder will never start a second thread, but this does not incur a performance loss because single-threaded entropy decoding likely is the most efficient decoding structure to employ in such cases.

If the data arrival rate is faster than the decoder's single-thread decode rate, the end-of-slice structure incurs a performance consequence. In this case, the decoder will perform single threaded entropy decoding until it receives and decodes the backpointer. Once the decoder decodes the backpointer, it may engage additional threads to decode whatever strings in the slice may remain for entropy decoding. Nevertheless, it is believed that the end-of-slice structure contributes to reduced latency overall because, as discussed in FIG. 6, the encoder is able to transmit a slice's payload at a point earlier than it would otherwise be able to transmit if index tables were forced to be included with slice headers at the beginning of such slices.

Figure 10:
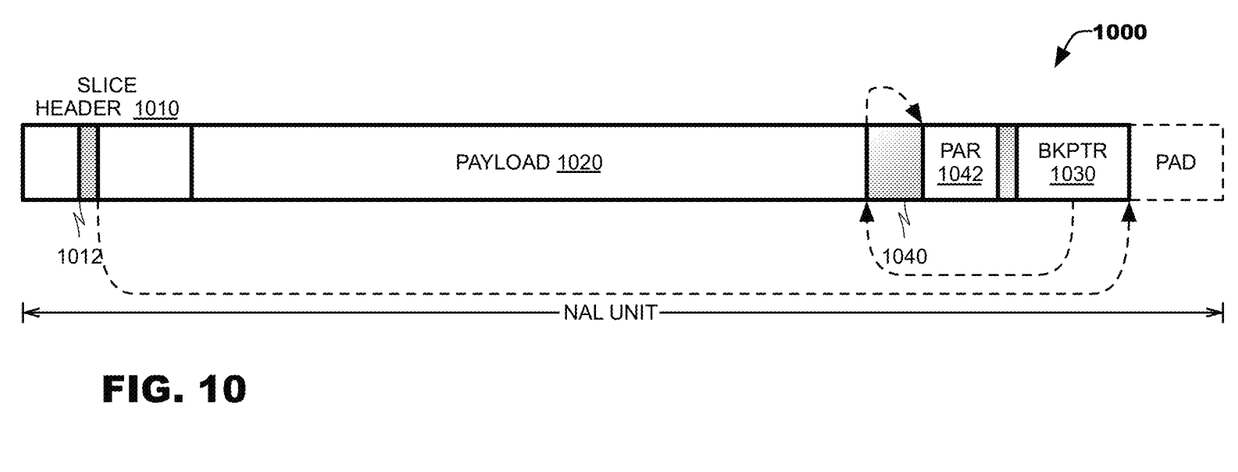
FIG. 10 illustrates a syntax according to an embodiment of the present invention.

The principles of the present invention also accommodate uses of end-of-slice coding for other types of coded information. The structure in Table 1 permits any data that must be generated after encoding to be transmitted after encoding, not just WPP entry points. Such other data may include post-filtering instructions or hints, or other information that is coding-dependent. For example, many coding systems also provide deblocking information within slice headers representing post-filtering operations that can be performed at a decoder following video reconstruction operations. Again, providing such deblocking in the beginning of slices can incur latency because a video coder must buffer all coded video data as it makes decisions as to the types of deblocking filters to be applied to the video, then code and insert its selections of the deblocking filters into the slice headers, before it can transmit the slice. Alternatively, the encoder may select a deblocking filter to be applied before coding occurs, which might prove to be sub-optimal. Embodiments of the present invention, therefore, as illustrated in FIG. 10, accommodate use of end-of-slice indicators, such as backpointers 1030 and signaling structures 1040 that contain the encoder's parameter selections (such as deblocking filter selections) to reduce such latencies. In this embodiment, the slice 1000 may include a slice extension 1040 that includes the parameter indicators 1042 merged with other content. The backpointer 1030 may point to the start point of the slice extension 1040 and the slice extension may include data, such as a slice extension tag, that indicates the onset of the parameter indicators 1042.

Figure 11:
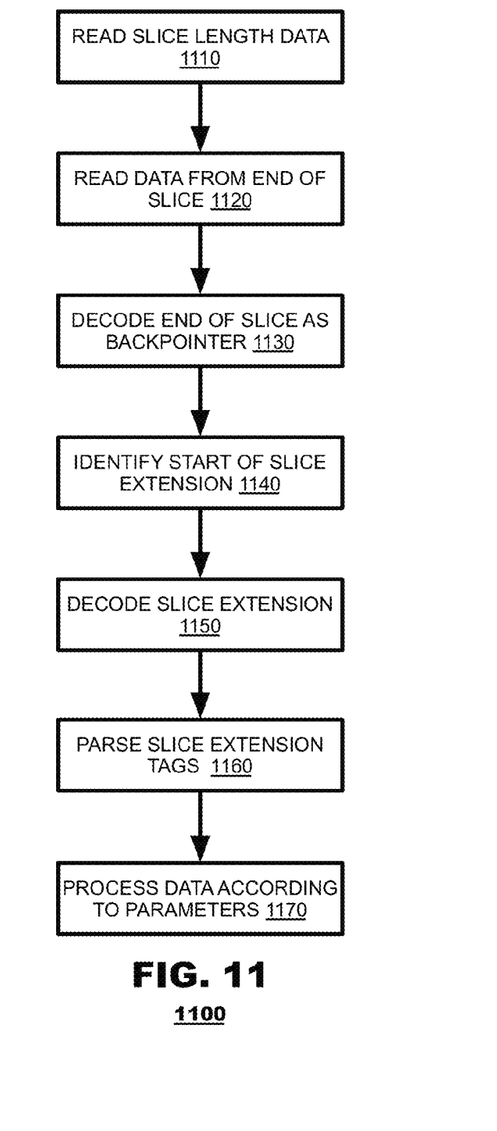
FIG. 11 illustrates a method according to another embodiment of the present invention.

FIG. 11 illustrates an entropy decoding method 1100 according to an embodiment of the present invention. The method 1100 may begin when a new coded slice is available for decoding. According to the method 1100, slice length data may be received (box 1110) to determine the length of a backpointer provided at the end of the slice. The slice length data may be derived from transmission data recovered by recovery processes within a receiver. As in prior embodiments, the length of a slice may be determined from the length of a NAL unit that contained the slice, less any padding bits that are indicated as provided within the NAL unit. Alternatively, a boundary between slices may be determined from NAL unit start codes that indicate the beginning and ends of NAL units; the end of a slice within a current NAL unit may be taken as the bit that precedes a start code of a next-received NAL unit. Having identified the end of the slice, the method 1100 may read data from the end of the slice in reverse bits order (box 1120). The method 1100 may decode the end-of-slice data as a backpointer (box 1130) and identify the location of a slice extension therefrom (box 1140). The method 1100 may decode the slice extension and parse the slice extension according to slice extension tags contained therein (boxes 1150-1160). For example, a first type of slice extension tag may indicate the presence of deblocking filter selections while another type of slice extension tag may indicate the presence of some other coding parameter. Thereafter, the method 1100 may cause received data to be processed according to the parameter selections identified by each slice extension tag (box 1170).

For ease of description, the preceding discussion has presented the entropy-coding and entropy-decoding processes in the context of a video coding/decoding system (FIGS. 1 and 7). The principles of the present invention, however, are not so limited. The entropy-coding and decoding processes of the present invention find application to other types of coding systems in which source data is presented to an entropy-coder as a plurality of sequences that are coded as strings. For example, the principles of the present invention find application in audio coding/decoding systems and/or encryption systems. In both cases, sequences of coded source data (coded audio data or encrypted data, as the case may be) may be presented to an entropy coder, which may code the sequences as respective strings. The strings may develop coding and decoding contexts for other strings. The coded strings may be packaged into transmission units that include a header, payload, index table and back pointer as described above in FIG. 4. The transmission unit may be parsed by an entropy decoder, which interprets the header, back pointer and index table respectively to identify coded strings therein. The entropy decoder also may engage parallel decoding threads corresponding to the threads of FIG. 5, as discussed above. In this regard, the entropy coding and decoding processes described herein may apply to a wide variety of data types and content.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:

1. A method, comprising:
coding a plurality of data items as serially-coded data sequences, the coded data sequences having lower bit rates than the data items,
building a transmission sequence from the serially-coded data sequences,
building an index table having a plurality of entries representing respective start points of the serially-coded data sequences within the transmission sequence, and
transmitting the transmission sequence and the index table in a channel, wherein the transmission sequence precedes the index table in transmission order.

2. The method of claim 1, wherein the serially-coded data sequences each represent entropy-coded video data.

3. The method of claim 1, wherein the serially-coded data sequences each represent entropy-coded audio data.

4. The method of claim 1, wherein the serially-coded data sequences each represent entropy-coded video encryption data.

5. The method of claim 1, wherein the transmission sequence and the index table and transmitted in a common NAL unit.

6. The method of claim 1, wherein the transmission sequence and the index table and transmitted in different NAL units.

7. The method of claim 1, further comprising transmitting a back pointer to the channel, following transmission of the index table, that identifies a location of the index table.

8. A method, comprising:
entropy coding input data and generating a plurality of coded strings therefrom, wherein a context of at least one coded string may be derived from a prior coded string,
building a transmission unit that includes, in series:
a header region identifying the transmission unit,
a payload region including the coded strings,
an index table identifying locations of the coded strings within the payload region and
a back pointer, and
transmitting the transmission unit to a decoder.

9. The method of claim 8, wherein the transmitting of the coded slices occurs prior to the building of the index table.

10. The method of claim 8, wherein the back pointer is a variable length coded field provided in reverse order to other bits in the transmission unit.

11. The method of claim 8, wherein the transmission unit is a slice for video coding.

12. The method of claim 8, wherein the index table includes fields representing positions of the coded strings as offsets from a common location of the transmission unit.

13. The method of claim 8, wherein the index table includes fields representing positions of the coded strings as offsets from start positions of other strings.

14. The method of claim 8, wherein the index table includes fields representing positions of the coded strings as a difference in offsets of start positions of other strings.

15. The method of claim 8, wherein the header region includes a flag indicating the presence of the back pointer in the transmission unit.

16. A method, comprising:
coding a plurality of data items as serially-coded data sequences,
building a transmission sequence from the serially-coded data sequences,
writing coding selections associated with the serially-coded data sequences into the transmission sequence in a transmission position following the serially-coded data sequences, and
transmitting the transmission sequence and the coding selections in a channel, wherein the transmission sequence precedes the coding selections in transmission order.

17. A method, comprising:
deriving a length of a transmission unit received as serial data from a channel,
reading a back pointer from an end of the transmission unit,
determining, from the back pointer, a location of an index table, and
parsing the transmission unit into a plurality of entropy-coded strings according to fields of the index table, and
entropy decoding the strings in a plurality of parallel processing systems.

18. The method of claim 17, further comprising, for a given string, reading context data from a first processing system to a second processing system, the context data providing a decoding context for entropy-decoding a string assigned to the second processing system.

19. The method of claim 17, wherein the entropy-coded strings precede the index table in the received serial data.

20. The method of claim 17, wherein the back pointer is a variable length coded field provided in reverse order to other bits in the transmission unit.

21. The method of claim 17, wherein the transmission unit is a slice for video coding.

22. The method of claim 17, wherein the index table includes fields representing positions of the coded strings as offsets from a common location of the transmission unit.

23. The method of claim 17, wherein the index table includes fields representing positions of the coded strings as offsets from start positions of other strings.

24. The method of claim 17, wherein the index table includes fields representing positions of the coded strings as a difference in offsets of start positions of other strings.

25. The method of claim 17, wherein the header region includes a flag indicating the presence of the back pointer in the transmission unit.

26. Computer readable storage device to store entropy-coded data having stored thereon a serial datastream comprising in order:
a header,
a payload with a plurality of entropy-coded strings,
an index table having entries identifying locations of the strings within the datastream and
a back pointer.

27. The storage device of claim 26, wherein the entropy-coded strings precede the index table in the received serial data.

28. The storage device of claim 26, wherein the back pointer is a variable length coded field provided in reverse order to other bits in the datastream.

29. The storage device of claim 26, wherein the index table includes fields representing positions of the coded strings as offsets from a common location of the datastream.

30. The storage device of claim 26, wherein the index table includes fields representing positions of the coded strings as offsets from start positions of other strings.

31. The storage device of claim 26, wherein the index table includes fields representing positions of the coded strings as a difference in offsets of start positions of other strings.

32. The storage device of claim 26, wherein the header includes a flag indicating the presence of the back pointer in the datastream.

33. A method, comprising:
receiving data from a channel including a transmission sequence having a plurality of serially-coded data sequences contained therein and an index table, wherein the transmission sequence precedes the index table in reception order,
parsing the index table to identify respective start points of the serially-coded data sequences within the transmission sequence, and
decoding at least two of the data sequences using parallel processing threads, the decoding generating decoded data sequences having higher bit rates than the coded data sequences.

34. The method of claim 33, wherein the serially-coded data sequences each represent entropy-coded video data.

35. The method of claim 33, wherein the serially-coded data sequences each represent entropy-coded audio data.

36. The method of claim 35, wherein entropy decoding of a first data sequence develops an entropy decoding context for decoding of a second data sequence.

37. The method of claim 33, wherein the serially-coded data sequences each represent entropy-coded video encryption data.

38. The method of claim 33, wherein the transmission sequence and the index table are received in a common NAL unit.

39. The method of claim 33, wherein the transmission sequence and the index table are received in different NAL units.

* * * * *